United States Patent
Nagasawa

(10) Patent No.: US 11,886,062 B2
(45) Date of Patent: Jan. 30, 2024

(54) OPTICAL DEVICE AND METHOD FOR MANUFACTURING OPTICAL DEVICE

(71) Applicant: DEXERIALS CORPORATION, Tokyo (JP)

(72) Inventor: Yoshikazu Nagasawa, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 17/278,584

(22) PCT Filed: Sep. 25, 2019

(86) PCT No.: PCT/JP2019/037681
§ 371 (c)(1),
(2) Date: Mar. 22, 2021

(87) PCT Pub. No.: WO2020/067202
PCT Pub. Date: Apr. 2, 2020

(65) Prior Publication Data
US 2021/0349343 A1 Nov. 11, 2021

(30) Foreign Application Priority Data

Sep. 27, 2018 (JP) ................................. 2018-181555
Sep. 25, 2019 (JP) ................................. 2019-174519

(51) Int. Cl.
*G02F 1/1333* (2006.01)
*B32B 37/12* (2006.01)
*G02F 1/13* (2006.01)
(Continued)

(52) U.S. Cl.
CPC .... *G02F 1/133331* (2021.01); *B32B 37/1284* (2013.01); *G02F 1/1306* (2013.01);
(Continued)

(58) Field of Classification Search
None
See application file for complete search history.

(56) References Cited

U.S. PATENT DOCUMENTS 6,361,389 B1 * 3/2002 Hogue ................. G02F 1/1339
445/24
9,547,192 B2 1/2017 Fujita
(Continued)

FOREIGN PATENT DOCUMENTS

EP 2487670 A1 8/2012
JP 2010-066711 A 3/2010
(Continued)

OTHER PUBLICATIONS

May 31, 2022, Chinese Office Action issued for related CN Application No. 201980059828.5.
(Continued)

*Primary Examiner* — Richard H Kim
(74) *Attorney, Agent, or Firm* — Paratus Law Group, PLLC

(57) ABSTRACT

Provided is a method for manufacturing an optical device capable of surely curing a photocurable resin composition. The method for manufacturing an optical device 1 in which an optical member 2 and a transparent panel 4 are bonded together via a cured resin layer 3 includes: a step of forming, on one of the optical member 2 and the transparent panel 4, a wall 12 surrounding a forming region for the cured resin layer 3 and having at least one opening 13; a step of laminating the optical member 2 and the transparent panel 4 to form a laminated body 10 in which a resin filling space 14 surrounded by the wall 12 is formed between the optical member 2 and the transparent panel 4; a step of filling the resin filling space 14 of the laminated body 10 with a photocurable resin composition 30; and a step of curing the photocurable resin composition 30 to form the cured resin layer 3.

33 Claims, 12 Drawing Sheets

(51) Int. Cl.
  *G02F 1/1362* (2006.01)
  *B32B 38/00* (2006.01)
(52) U.S. Cl.
  CPC ............ *G02F 1/136209* (2013.01); *B32B 2037/1253* (2013.01); *B32B 2038/0076* (2013.01); *B32B 2457/202* (2013.01)

(56) References Cited

U.S. PATENT DOCUMENTS

| | | | |
|---|---|---|---|
| 2005/0083465 A1* | 4/2005 | Niiyama | G02F 1/133308 349/122 |
| 2009/0231516 A1* | 9/2009 | Okada | G02F 1/133351 445/25 |
| 2012/0263964 A1 | 10/2012 | Toyoda et al. | |
| 2018/0040268 A1 | 2/2018 | Murai | |
| 2020/0040131 A1* | 2/2020 | Fukamoto | C09J 133/06 |

FOREIGN PATENT DOCUMENTS

| | | |
|---|---|---|
| JP | 2015-052795 A | 3/2015 |
| JP | 2015-072447 A | 4/2015 |
| JP | 2015-099285 A | 5/2015 |
| JP | 2018-025589 A | 2/2018 |
| KR | 10-2010-0039495 A | 4/2010 |
| TW | 200519794 A | 6/2005 |
| WO | WO 2014/054592 A1 | 4/2014 |

OTHER PUBLICATIONS

Feb. 28, 2022, European Search Report issued for related EP Application No. 19864961.8.

Jan. 3, 2023, Chinese Office Action issued for related CN Application No. 201980059828.5.

Mar. 9, 2023, Taiwanese Office Action issued for related TW Application No. 108135185.

Jan. 17, 2023, Korean Office Action issued for related KR Application No. 10-2021-7007440.

Aug. 21, 2023, Chinese Office Action issued for related CN Application No. 201980059828.5.

Oct. 14, 2023, Korean Office Action issued for related KR Application No. 10-2021-7007440.

* cited by examiner

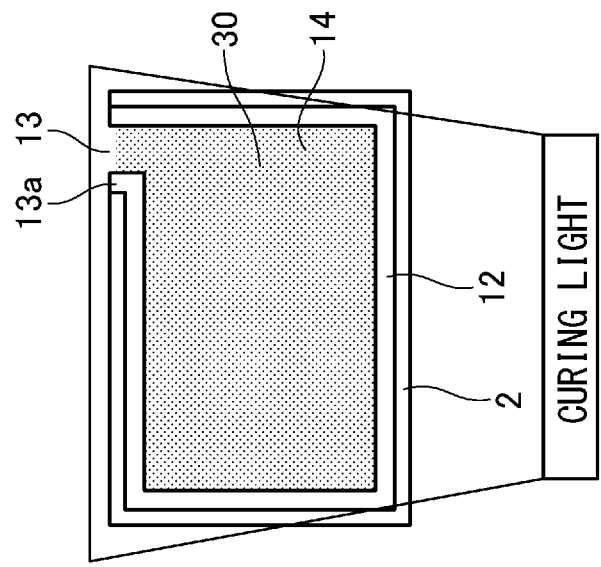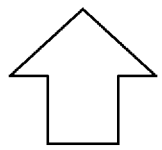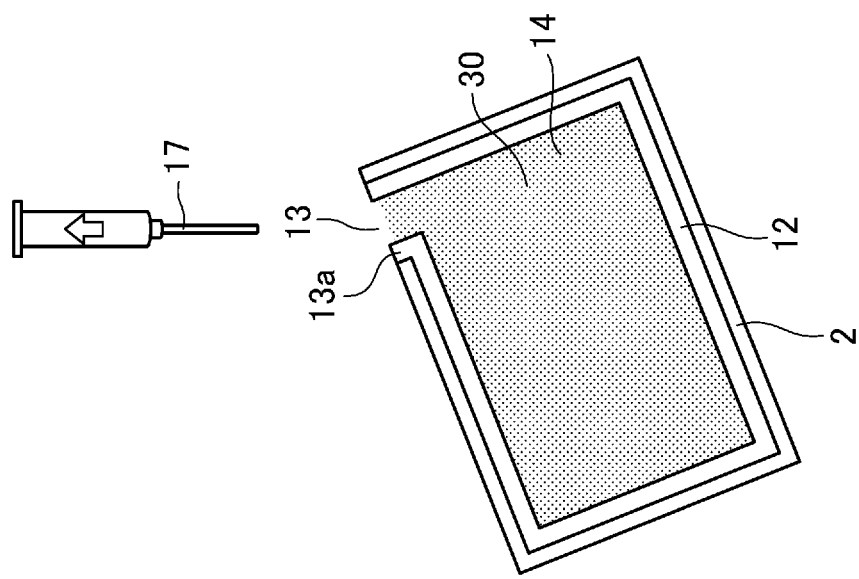
FIG. 13

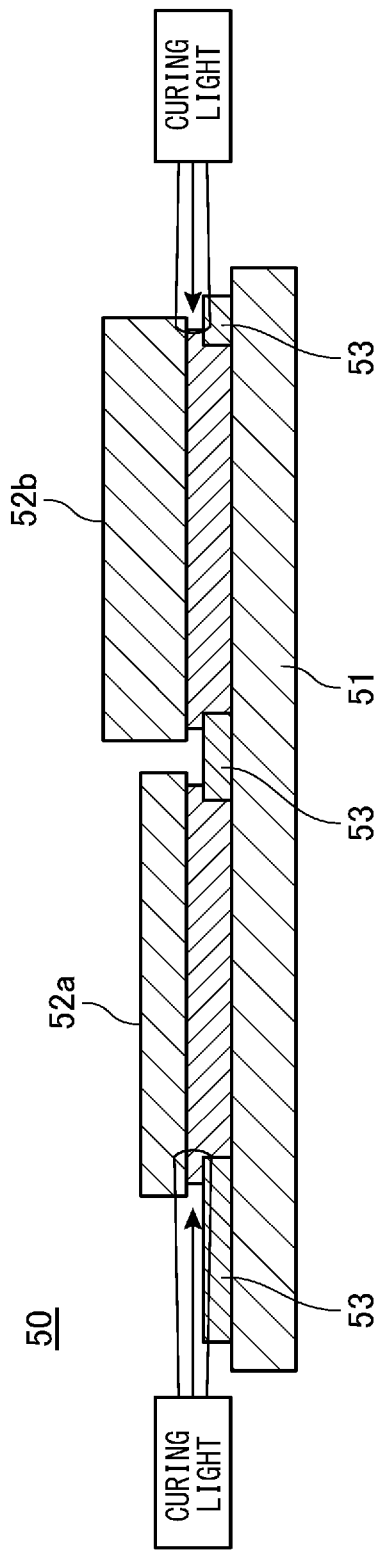

OPTICAL DEVICE AND METHOD FOR MANUFACTURING OPTICAL DEVICE

TECHNICAL FIELD

The present technology relates to an optical device in which an optical member such as a liquid crystal display panel and a transparent panel such as a protective sheet bonded to the display surface side of the optical member are bonded via a cured resin layer, and a method for manufacturing the optical device. This application is a National Stage Patent Application of PCT International Patent Application No. PCT/JP2019/037681 filed on Sep. 25, 2019 under 35 U.S.C. §371, which claims priority on the basis of Japanese Patent Application No. 2018-181555 filed on Sep. 27, 2018 in Japan and Japanese Patent Application No. 2019-174519 filed on Sep. 25, 2019 in Japan, and these applications are incorporated herein by reference.

BACKGROUND ART

Conventionally, in optical devices such as liquid crystal display devices used in information terminals such as smartphones or car navigation devices, a light-transmissive cured resin layer is provided between an optical member such as a liquid crystal display panel and a transparent panel for protecting the optical member for the purpose of thinning the device and improving visibility.

For example, a method for forming the cured resin layer includes: applying a photocurable resin composition to a transparent panel to form a curable resin layer; laminating an optical member such as a liquid crystal display panel or an organic EL panel through the curable resin layer; and then curing the curable resin layer (Patent Document 1).

As a method for applying the photocurable resin composition to the transparent panel, there have been used a method in which the photocurable resin composition is discharged from a moving slit nozzle over the entire width to the surface of the transparent panel and a method in which the photocurable resin composition is applied by screen printing, among other methods.

PRIOR ART REFERENCE

Patent Reference

Patent Document 1: Japanese Unexamined Patent Publication No. 2015-52795

SUMMARY OF THE INVENTION

Problem to be Solved by the Invention

However, in the conventional manufacturing method described above, when the optical member and the transparent panel become large in size, there arise problems in which a large vacuum laminating device is required for bonding and a large autoclave is required after bonding.

Further, in the photocurable resin composition applied on a light shielding portion provided on the transparent panel, since the curing light irradiated from the surface side of the transparent panel is shielded by the light shielding portion to inhibit the curing, so-called side curing is performed by irradiating curing light from the side surface of the transparent panel.

In recent years, there has been proposed an optical device in which a plurality of optical members are arranged close to each other and one transparent panel is laminated. As shown in FIG. 14, in such an optical device 50, light shielding portions 53 respectively corresponding to optical members 52a, 52b are formed adjacently on a transparent panel 51. The side curing is possible in three sides of each light shielding portion 53 facing the side surface of the transparent panel 51; however, the side curing is difficult in the portion where the optical members 52a, 52b are adjacent to each other.

In view of the above, it is an object of the present technology to provide an optical device which does not require a large vacuum laminating device, an autoclave process, or a side curing step even in a large optical device, and a method for manufacturing the optical device. Another object of the present technology is to provide a method for manufacturing an optical device, in which a plurality of optical members are arranged in close proximity, capable of reliably curing a photocurable resin composition.

Means for Solving the Problem

In order to solve the problems described above, an aspect of the present invention provides a method for manufacturing an optical device in which an optical member and a transparent panel are bonded together via a cured resin layer, including: a step of forming, on one of the optical member and the transparent panel, a wall surrounding a forming region for the cured resin layer and having at least one opening; a step of laminating the optical member and the transparent panel to form a laminated body in which a resin filling space surrounded by the wall is formed between the optical member and the transparent panel; a step of filling the resin filling space of the laminated body with a photocurable resin composition; and a step of curing the photocurable resin composition to form the cured resin layer.

In addition, an optical device according to the present technology includes: an optical member; a transparent panel bonded to the optical member; and a cured resin layer interposed between the optical member and the transparent panel, wherein, on the transparent panel, a light shielding portion is formed in a region corresponding to the peripheral edge of a display region of the optical member, and wherein, on the display region side of the light shielding portion, a wall defining a forming region for the cured resin layer is formed.

Further, an optical device according to the present technology includes: a plurality of optical members; one transparent panel bonded to the plurality of optical members; and a cured resin layer interposed between the plurality of optical members and the transparent panel, wherein, on the transparent panel, a light shielding portion is formed in a region corresponding to the peripheral edge of a display region of the optical member, and wherein, on the display region side of the light shielding portion, a wall defining a filling region for the cured resin layer is formed.

Effects of the Invention

According to the present technology, since the photocurable resin composition is injected and cured in the resin filling space defined by the wall, a large vacuum laminating device, an autoclave step and a side curing step are not required.

BRIEF DESCRIPTION OF THE DRAWINGS

FIG. 13 is a side view illustrating a step of tilting the laminated body to fill the resin filling space with the curable resin composition and then returning it to a horizontal position for curing.

FIG. 14 is a cross-sectional view illustrating a step of performing a side curing by bonding an optical member to a transparent panel having light shielding portions formed adjacent to each other.

MODE FOR CARRYING OUT THE INVENTION

Figure 1A:
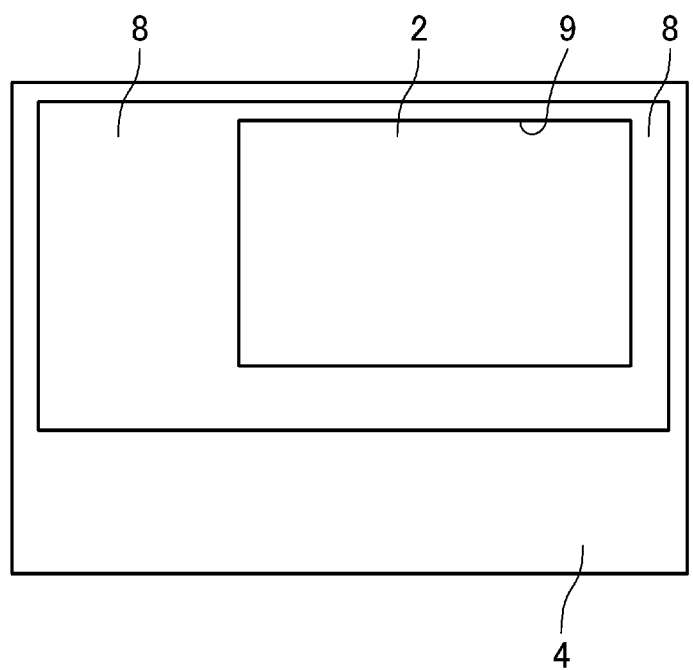
FIG. 1A is a plan view and FIG. 1B is a cross-sectional view illustrating a single-panel optical device.
Figure 1B:
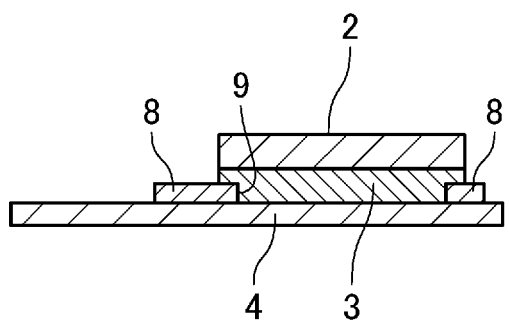
Figure 2A:
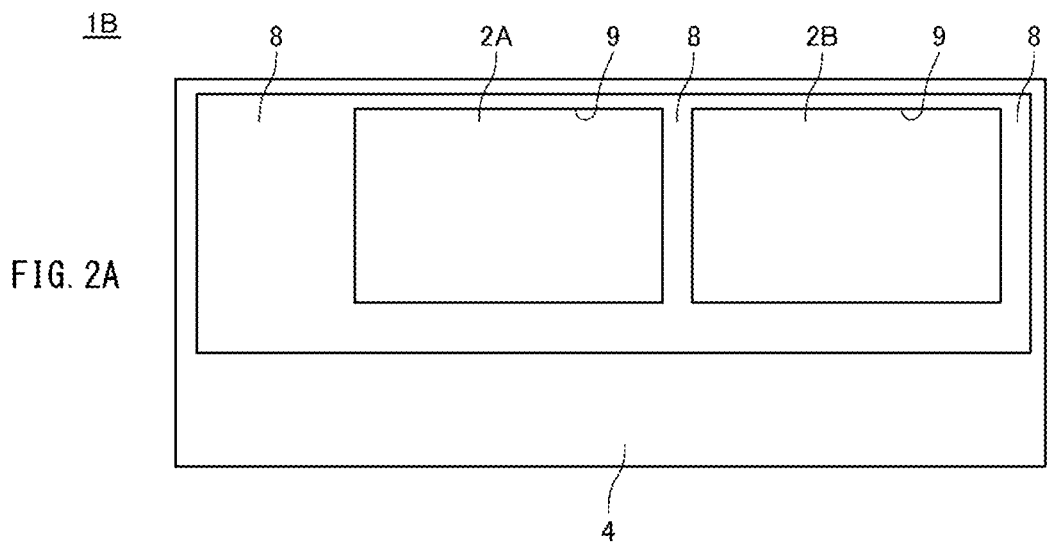
FIG. 2A is a plan view.
Figure 2B:
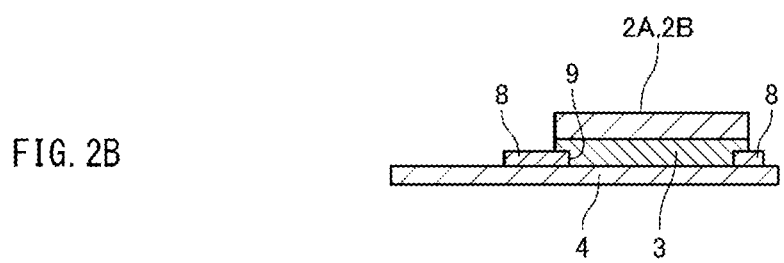
FIG. 2B is a cross-sectional view illustrating a multi-panel optical device.

Hereinafter, an optical device and a method for manufacturing the optical device according to the present technology will be described in detail with reference to the drawings. It should be noted that the present disclosure is not limited to the following embodiments and various modifications can be made without departing from the scope of the present technology. Moreover, the features illustrated in the drawings are shown schematically and are not intended to be drawn to scale. Actual dimensions should be determined in consideration of the following description. Furthermore, those skilled in the art will appreciate that dimensional relations and proportions may be different among the drawings in certain parts.

Optical Device 1

The preset technology provides an optical device 1 formed by bonding an optical member 2 and a transparent panel 4 through a cured resin layer 3, and a method for manufacturing an optical device 1. Prior to the description of the method for bonding the transparent panel 4 and the optical member 2, the configuration of the optical device 1 will be described.

The optical device 1 is an optical device such as a liquid crystal display panel and an organic EL display panel, among others, and is used in various information terminals and information devices such as a smartphone, a car navigation device, an instrument panel, and the like. As shown in FIGS. 1A, 1B and FIGS. 2A, 2B, the optical device 1 is provided with a light-transmissive cured resin layer 3 between the optical member 2 such as a liquid crystal display panel and the transparent panel 4 for protecting the optical member 2 for the purpose of thinning the device and improving visibility.

The optical device 1 includes a single-panel optical device 1A in which one optical member 2 and one transparent panel 4 are laminated via the cured resin layer 3 as shown in FIG. 1, and a multi-panel optical device 1B in which a plurality of optical members 2 and one transparent panel 4 are laminated via the cured resin layer 3 as shown in FIG. 2. The multi-panel optical device 1B is formed by bonding the plurality of optical members 2 to the transparent panel 4, and in the example shown in FIG. 2, the two optical members 2A, 2B are arranged side by side.

Transparent Panel 4

The transparent panel 4 has light transmissive property and is laminated with the optical member 2 through the cured resin layer 3 to cover and protect the display surface of the optical member 2 while ensuring the visibility of the optical member 2.

The transparent panel 4 may be made of glass or a resin material such as acrylic resin, polyethylene terephthalate, polyethylene naphthalate, or polycarbonate, as long as the transparent panel 4 is optically transparent so that an image formed on the optical member is visible. These materials can be subjected to a single-side or double-side hard coat treatment, antireflection treatment, or the like. When the optical member 2 described later is a touch panel, a part of the member of the touch panel can be used as the transparent panel 4.

On the transparent panel 4, in order to improve the brightness and contrast of the display image, a black frame-shaped light shielding portion 8 called a black matrix is formed in a region corresponding to the peripheral edge of the display region of the optical member 2. In the optical device 1, the inside of the light shielding portion 8 surrounding the display region of the optical member 2 functions as a display portion 9 for transmitting an image displayed on the display region of the optical member 2 through the transparent panel 4.

The light shielding portion 8 is formed to have a uniform thickness by applying a coating material colored in black or the like by a screen printing method or the like, and then drying and curing the coating material. The thickness of the light shielding portion 8 is usually 5 to 100 μm. As shown in FIG. 2, the transparent panel 4 of the multi-panel optical device 1B is provided with a plurality of display portions 9 by forming frame-shaped light shielding portions 8 in accordance with the optical members 2A and 2B.

The shape of the transparent panel 4 is not particularly limited, and may be, for example, a flat shape, a shape curved in one direction, a rotated paraboloid, a hyperbolic paraboloid, or another quadric surface, or may have a flat portion in a part of a curved shape and a quadric surface shape.

It should be noted that the dimensional characteristics such as the shape of the curvature and thickness and physical properties such as elasticity of the cover member can be appropriately determined according to the intended use of the optical device 1.

Optical Member 2

Examples of the optical member 2 includes image display members such as a liquid crystal display panel, an organic EL display panel, a plasma display panel, and a touch panel. Here, the touch panel means an image display/input panel which combines a display element such as a liquid crystal display panel and a position input device such as a touch pad. The surface shape of the optical member 2 on the side of the transparent panel 4 is not particularly limited, but is preferably flat. Moreover, a polarizing plate may be arranged on the surface of the optical member 2.

Wall 12

In the optical device 1 according to the present technology, a wall 12 is formed on a bonding surface of one of the optical member 2 and the transparent panel 4 to define a forming region for a cured resin layer 3 to be described later. The wall 12 defines a filling region for a photocurable resin composition 30 constituting the cured resin layer 3, and prevents the photocurable resin composition 30 from protruding outward from the wall 12. The wall 12 is formed substantially in a frame shape along the light shielding portion 8 on the display region side of the light shielding portion 8 formed in a frame shape. Thus, the wall 12 is provided in contact with the inside of the light shielding portion 8. The wall 12 may be formed from the upper surface of the light shielding portion 8 to the display region side surrounded by the light shielding portion 8.

Further, although the wall 12 may be formed on the optical member 2 or the transparent panel 4, it is generally preferably formed on the optical member 2 side having a flat display region since it is preferably formed on a flat surface so as to have a substantially uniform thickness over the entire length. It is needless to say that the wall 12 may be formed on the transparent panel 4. By bonding the optical member 2 and the transparent panel 4, the wall 12 defines, together with the optical member 2 and the transparent panel 4, a filling space to be filled with the photocurable resin composition 30. The wall 12 has elasticity and high adhesiveness as described later, thereby preventing the liquid leakage of the injected photocurable resin composition 30 by being closely contact with the transparent panel 4 or the optical member 2 to be bonded.

In addition, the wall 12 is preferably formed of the same resin composition as that of the cured resin layer 3 described later. Since the wall 12 is formed inside the light shielding portion 8 to be formed on the display portion 9 of the optical device 1 which transmits an image displayed on the display region of the optical member 2, the wall 12 preferably has light transmissive property similar to the cured resin layer 3. Further, it is in contact with the cured resin layer 3 in the display portion 9, the interface with the cured resin layer 3 does not visible and display properties are not impaired by forming them with the same resin composition.

The height of the wall 12 can be appropriately set in accordance with the thickness of the cured resin layer 3 to be formed, and as an example, it is formed to be 50 to 100 µm in a state of being sandwiched between the optical member 2 and the transparent panel 4. The step of forming such a wall 12 and the step of forming a filling space for the photocurable resin composition will be described later in detail.

Cured Resin Layer

The cured resin layer 3 interposed between the transparent panel 4 and the optical member 2 has a light transmissive property so that the image displayed by the optical member 2 such as an image display member is visible.

The photocurable resin composition 30 constituting the cured resin layer 3 is liquid, and specifically exhibits a viscosity of 0.01 to 100 Pa*s (25° C.) with a cone plate type viscometer, for example.

The photocurable resin composition 30 preferably contains a base component (component (a)), an acrylic monomer component (component (b)), a plasticizer component (component (c)) and a photopolymerization initiator (component (d)).

Component (a)

The base component (a) is a film-forming component of the light-transmissive cured resin layer 3 and contains at least one of an elastomer and an acrylic oligomer. Both may be used in combination as the component (a).

Examples of elastomers include acrylic copolymer consisting of acrylic ester, polybutene, and polyolefin, among others. The weight average molecular weight of the acrylic ester copolymer is preferably 5,000 to 500,000, and the number of repetitions n of polybutene is preferably 10 to 10,000.

Preferred examples of acrylic oligomers include (meth) acrylate oligomers having a backbone of polyisoprene, polyurethane or polybutadiene, among others. In the present specification, the term "(meth) acrylate" includes acrylate and methacrylate.

Preferred examples of (meth) acrylate oligomers having a polyisoprene backbone include esterified product of maleic anhydride adduct of polyisoprene polymer and 2-hydroxyethyl methacrylate UC102 (KURARAY) (molecular weight in terms of polystyrene: 17,000), UC203 (KURARAY) (molecular weight in terms of polystyrene: 35,000), and UC-1 (KURARAY) (molecular weight about 25,000).

Preferred examples of the (meth) acrylic-type oligomers having a polyurethane backbone include aliphatic urethane acrylate (EBECRYL 230 (Daicel-Cytec) (molecular weight of 5,000) and UA-1 (Light Chemical)), among others.

For (meth) acrylate oligomer, known (meth) acrylate oligomer having a polybutadiene backbone may be employed.

Component (b)

The acrylic monomer component (b) is used as a reactive diluent in order to impart sufficient reactivity and coatability to the photocurable resin composition in the manufacturing step of the optical device. Examples of such acrylic monomers include 2-hydroxypropyl methacrylate, benzyl acrylate, and dicyclopentenyloxyethyl methacrylate, among others.

It should be noted that the total content of the base component (a) and the acrylic monomer component (b) in the photocurable resin composition 30 is preferably 25 to 85% by mass.

Component (c)

The plasticizer component (c) is used to impart a buffer property to the cured resin layer and to reduce the cure shrinkage of the photocurable resin composition, and does not react with the acrylate oligomer component of a component (a) and the acrylic monomer component of a component (b) during irradiation of an ultraviolet-ray. Such plasticizer components contain a solid tackifier (1) and a liquid oil component (2).

Examples of the solid tackifier (1) include: terpene-based resins such as terpene resin, terpene phenol resin, and hydrogenated terpene resin; rosin-based resins such as natural rosin, polymerized rosin, rosin ester, and hydrogenated rosin; and terpene-based hydrogenated resins, among others. In addition, non-reactive oligomers obtained by low molecular weight polymerizing the above-mentioned acrylic monomers in advance can also be used; specifically, copolymers of butyl acrylate and 2-hexyl acrylate and acrylic acid, or copolymers of cyclohexyl acrylate and methacrylic acid can be used.

The liquid oil component (2) may contain a polybutadiene type oil or a polyisoprene type oil.

The content of the plasticizer component (c) in the photocurable resin composition 30 is preferably 10 to 65% by mass.

Component (d)

As the photopolymerization initiator designated as the component (d), known photo radical polymerization initiators can be used, which include 1-hydroxy-cyclohexyl phenyl ketone (IRGACURE 184, BASF), 2-hydroxy-1-{4-[4-(2-hydroxy-2-methyl-propionyl) benzyl]phenyl}-2-methyl-1-propan-1-one (IRGACURE 127, BASF), benzophenone, and acetophenone, among others.

Insufficient amount of such a photopolymerization initiator relative to 100 parts by mass in total of the base component (a) and the acrylic monomer component (b) result in insufficient curing at the time of ultraviolet irradiation and excessive amount tends to cause problems of foaming since cleavage will increase outgassing; the amount, therefore, is preferably 0.1 to 5 parts by mass, and more preferably 0.2 to 3 parts by mass.

The photocurable resin composition 30 can also contain a chain transfer agent for the purpose of adjusting the molecular weight. For example, 2-mercaptoethanol, lauryl mercaptan, glycidyl mercaptan, mercaptoacetic acid, 2-ethylhexyl thioglycolate, 2,3-dimethyl capto-1-propanol, and α-methylstyrene dimer may be used.

The photocurable resin composition 30 may further contain, if necessary, general additives including an adhesion improver such as a silane coupling agent and an antioxidant. Further, with regard to the components (a) to (d) of the photocurable resin composition, the components (a) may not be used if appropriate components (b) and (c) are employed.

MANUFACTURING STEPS

First Manufacturing Step

Next, a first manufacturing step of the optical device 1 will be described with reference to a manufacturing method for the multi-panel optical device 1B shown in FIG. 2. The first step of manufacturing the optical device 1 includes: a step (A) of forming, on one of the optical member 2 and the transparent panel 4, a wall 12 made of a first curable resin composition 31 surrounding the forming region of the cured resin layer 3 and having at least one opening 13; a step (B) of laminating the optical member 2 and the transparent panel 4 to form a laminated body 10 in which a resin filling space 14 surrounded by the wall 12 is formed between the optical member 2 and the transparent panel 4; a step (C) of injecting the photocurable resin composition 30 from the opening 13 of the laminated body 10; and a step (D) of curing the photocurable resin composition 30 to form the cured resin layer 3.

Step A

First, two optical members 2 and one transparent panel 4 are prepared. As described above, the transparent panel 4 has the light shielding portion 8 formed on one surface to which the optical member 2 is bonded. The light shielding portion 8 is formed so as to surround each display region of the two optical members 2 to be positioned adjacently, and forms two rectangular frames sharing one side.

Each of the optical member 2 is formed with the wall 12 made of the first curable resin composition 31, which surrounds the forming region where the cured resin layer 3 is to be formed and is provided with at least one opening 13.

Figure 3:
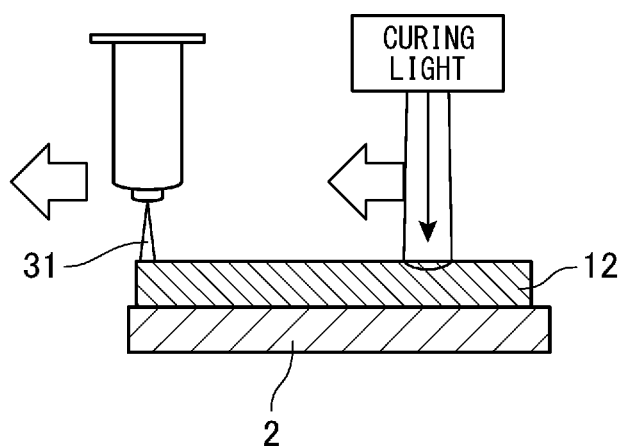
FIG. 3 is a side view illustrating an example of a step of applying and curing a first curable resin composition constituting a wall on an optical member.

As shown in FIG. 3, the wall 12 is formed by applying and curing the first curable resin composition 31 in a predetermined shape. The wall 12 is formed so as to abut the transparent panel 4, when bonded, from the upper surface to the inside of the light shielding portion 8, and as shown in FIG. 4, for example, is formed in a substantially frame shape in accordance with the light shielding portion 8 formed in a frame shape.

The first curable resin composition 31 is applied in a substantially frame shape by a dispenser, for example, as shown in FIG. 3. When a photocurable resin composition is used as the first curable resin composition 31, the first curable resin composition 31 is cured by irradiation with curing light after the application. In addition, as the first curable resin composition 31, a known resin supplying method such as printing may be used.

The cured wall 12 has elasticity and high adhesiveness, and when pressed against the transparent panel 4 later, it is deformed into a shape having a substantially trapezoidal cross section, bulges toward the upper surface of the light shielding portion 8 of the transparent panel 4 and the display region side of the optical member 2, and is closely contact with the upper surface of the light shielding portion 8 of the transparent panel 4 and the display region side of the optical member 2. Thus, the wall 12 forms the resin filling space 14 to be filled with the photocurable resin composition 30 between the optical member 2 and the transparent panel 4, and liquid leakage of the photocurable resin composition 30 is prevented. It should be noted that the application height of the first curable resin composition 31 is determined by adding, to the thickness of the bonding with the transparent panel 4, an thickness bulging toward the upper surface of the light shielding portion 8 and the display region side of the optical member 2 due to the deforming of the wall 12.

Figure 4:
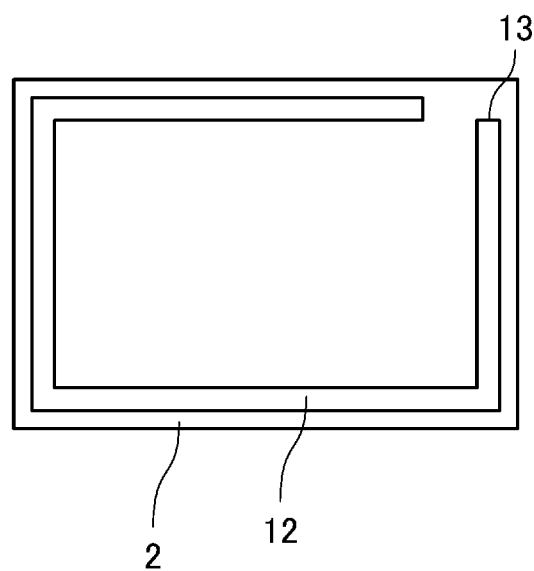
FIG. 4 is a plan view illustrating an optical member having substantially frame-shaped walls.

As shown in FIG. 4, the substantially frame-shaped wall 12 has at least one opening 13. The opening 13 functions as an injection hole for injecting the photocurable resin composition 30 into the resin filling space 14, and also functions as an exhaust hole for exhausting air from the resin filling space 14. The opening 13 has an opening diameter sufficient for inserting an injection nozzle 17 (see FIG. 6) to inject the photocurable resin composition 30 and exhausting air from the resin filling space 14. Although the opening 13 may be formed at any position of the wall 12, by forming it near a corner, the photocurable resin composition 30 can be injected with the opening 13 facing upward, and the exhaust of air in the resin filling space 14 is prevented from being inhibited by the wall 12, so that the resin filling space 14 can be surely filled with the photocurable resin composition 30.

Step B

Figure 5:
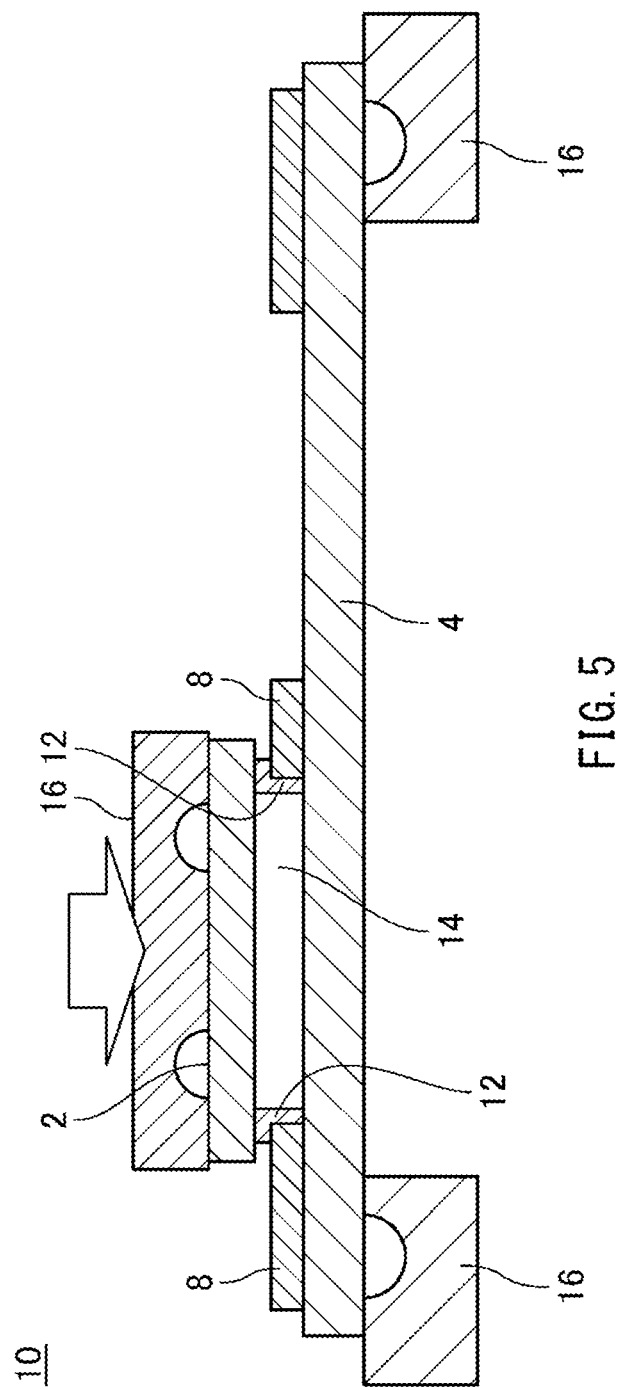
FIG. 5 is a cross-sectional view illustrating a laminated body in which a resin filling space surrounded by a wall is formed between an optical member and a transparent panel.

Next, as shown in FIG. 5, the optical member 2 and the transparent panel 4 are bonded to each other to form the laminated body 10 in which the resin filling space 14 surrounded by the wall 12 is formed between the optical member 2 and the transparent panel 4. FIG. 5 is an upper cross-sectional view illustrating the laminated body 10. The transparent panel 4 and the optical member 2 are supported by fixing plates 16 provided on the rear surface opposite to the bonding surface. The laminated body 10 is formed by arranging the transparent panel 4 and the optical member 2 so that the light shielding portion 8 and the wall 12 each formed in a frame shape faces each other, and sandwiching them by the fixing plates 16.

As described above, the wall 12 has elasticity and high adhesiveness, and when pressed against the transparent panel 4 via the fixing plate 16, the wall 12 is deformed into a shape having a substantially trapezoidal cross section, and brought in close contact with the upper surface and the inside of the light shielding portion 8 of the transparent panel 4. As a result, in the laminated body 10, the optical member 2, the transparent panel 4, and the wall 12 form the resin filling space 14 to be filled with the photocurable resin composition 30, and the photocurable resin composition 30 can be injected into the resin filling space 14 from the opening 13 provided in the wall 12. Further, in the resin filling space 14, close contact of the wall 12 with the transparent panel 4 can prevent the liquid leakage of the photocurable resin composition 30.

Step C

Figure 6:
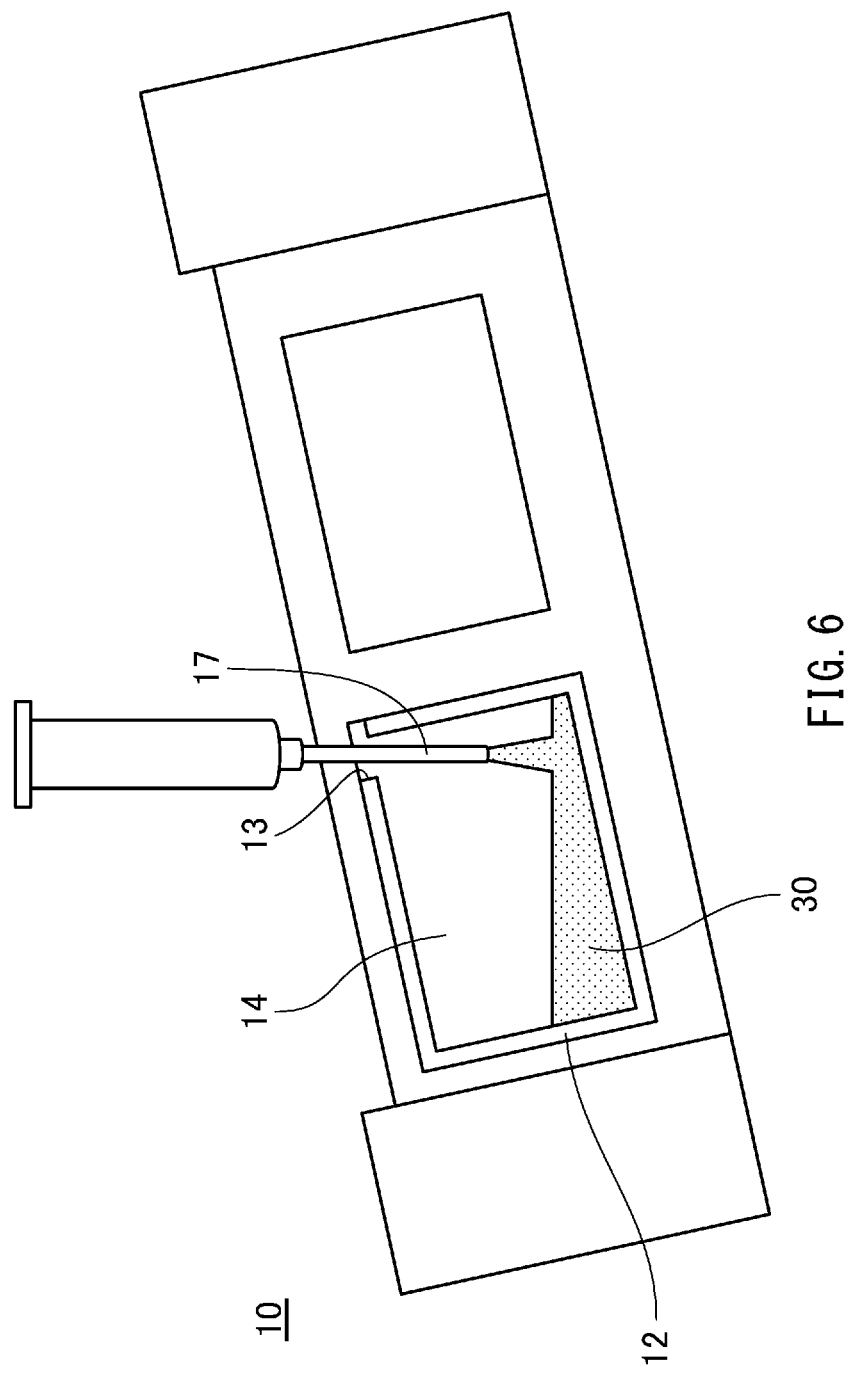
FIG. 6 is a side view illustrating a step of inserting an injection nozzle through an opening to fill the resin filling space with a curable resin composition.

Next, as shown in FIG. 6, an injection nozzle 17 is inserted from the opening 13 of the resin filling space 14, and the resin filling space 14 is filled with the photocurable resin composition 30. At this time, by injecting the photocurable resin composition 30 with the opening 13 facing upward, the air in the resin filling space 14 is exhausted from the opening 13, and the occurrence of voids can be prevented.

In addition, as shown in FIG. 6, the filling step of the photocurable resin composition 30 is preferably carried out by tilting the laminated body 10 so that the opening 13 is positioned at the uppermost position in the vertical direction. Thus, the air in the resin filling space 14 flows toward the opening 13, thereby preventing the air from remaining as voids in the corners of the resin filling space 14 or the like.

Although the injection nozzle 17 can inject the photocurable resin composition 30 as long as the tip is inserted into the opening 13, the photocurable resin composition 30 can be injected at a high speed while preventing the entrainment of air by dipping the tip into the photocurable resin composition 30 already injected in the resin filling space 14.

Step D

After the filling of the photocurable resin composition 30 is completed, the injection nozzle 17 is removed from the resin filling space 14.

Figure 7:
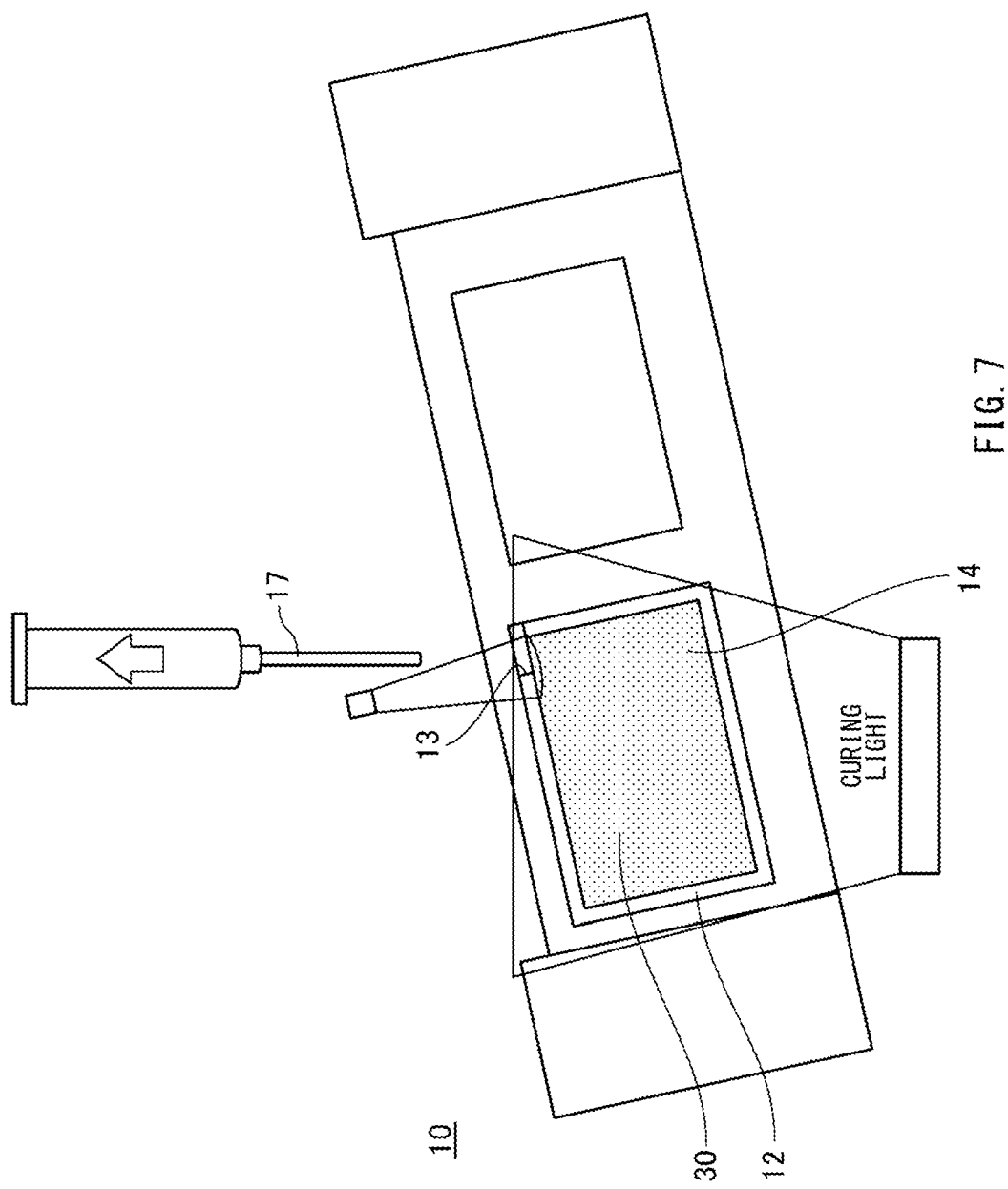
FIG. 7 is a side view illustrating a step of curing the curable resin composition by irradiating the resin filling space with curing light from the transparent panel side to form a cured resin layer.

Next, as shown in FIG. 7, curing light such as ultraviolet light is irradiated from the transparent panel 4 side to the resin filling space 14 to cure the photocurable resin composition 30 to form the cured resin layer 3. Further, by irradiating curing light from the side surface of the laminated body 10 toward the opening 13, the opening 13 is blocked by the cured resin layer 3.

Figure 8:
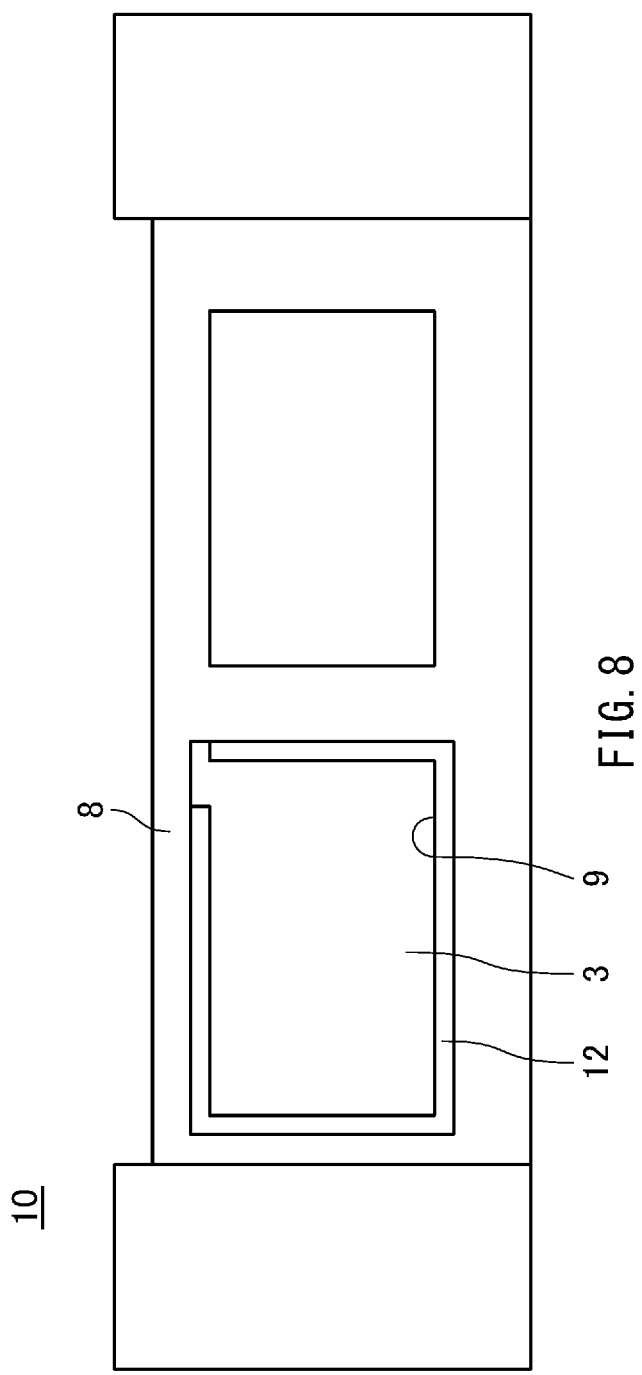
FIG. 8 is a plan view illustrating a multi-panel optical device in which one optical member and a transparent panel are laminated via a cured resin layer.

As a result, as shown in FIG. 8, one optical member 2 and the transparent panel 4 of the multi-panel optical device 1B are laminated via the cured resin layer 3. The other optical member 2 is also laminated on the transparent panel 4 via the cured resin layer 3 in the same process to complete the multi-panel optical device 1B (FIG. 2). The single-panel optical device 1A can also be manufactured by the same process. The irradiation of the photocurable resin composition 30 with curing light may be performed a plurality of times as required.

In such a multi-panel optical device 1B, the display region side of the light shielding portion 8 is a display portion 9 for transmitting an image displayed on the display region of the optical member 2, and the display portion 9 is formed with the light transmitting wall 12 and the cured resin layer 3. Further, in the display portion 9, since the wall 12 and the cured resin layer 3 are formed of the same resin composition, the interface between the wall 12 and the cured resin layer 3 does not visible, and display properties and visibility are not impaired. The same applies to the single-panel optical device 1A.

In the multi-panel optical device 1B, the wall 12 is formed in contact with the light shielding portion 8, and the resin filling space 14 surrounded by the wall 12 is filled with the photocurable resin composition 30. That is, the resin filling space 14 filled with the photocurable resin composition 30 is exposed on the side of the transparent panel 4 without causing blind spots. Therefore, even when the display portions 9 are disposed close to each other by sharing one side of the light shielding portion 8, the photocurable resin composition 30 in the resin filling space 14 can be irradiated with cured light through the transparent panel 4, thereby eliminating uncured portions.

In the multi-panel optical device 1B, a plurality of optical members 2 each having the wall 12 formed thereon may be simultaneously bonded to the transparent panel 4 to form a laminated body 10. Further, in the multi-panel optical device 1B, the photocurable resin composition 30 may be injected into each resin filling space 14 of the laminated body 10 formed by laminating the plurality of optical members 2 and may be cured simultaneously. Thus, the manufacturing time can be reduced.

Modification 1

Figure 9:
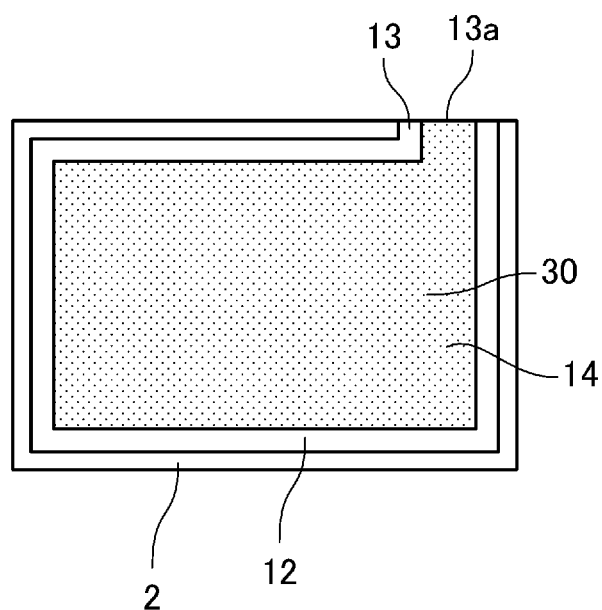
FIG. 9 is a side view illustrating a laminated body in which a projecting portion extending outside the resin filling space surrounded by the wall is formed in an opening of the wall.

As shown in FIG. 9, in the method for manufacturing the optical device according to the present technology, the opening 13 of the wall 12 may be formed with a projecting portion 13a extending outside the resin filling space 14 surrounded by the wall 12. By filling the photocurable resin composition 30 up to the projecting portion 13a, the photocurable resin composition 30 is sufficiently spread over the entire of the resin filling space 14 surrounded by the wall 12.

Modification 2

Figure 10:
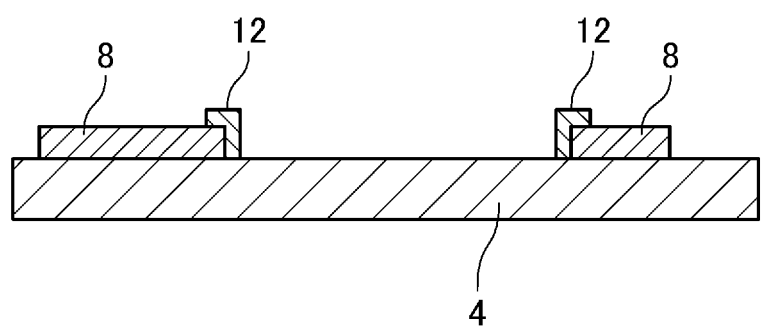
FIG. 10 is a cross-sectional view illustrating a state in which a wall is formed on the transparent panel side.

Further, although the wall 12 is formed on the optical member 2 side in the above embodiment, the method for manufacturing an optical device according to the present technology may form the wall 12 on the transparent panel 4 side, as shown in FIG. 10. In this case, the transparent panel 4 is preferably formed flat to form the wall 12 at a uniform height over the entire length.

Modification 3

Figure 11:
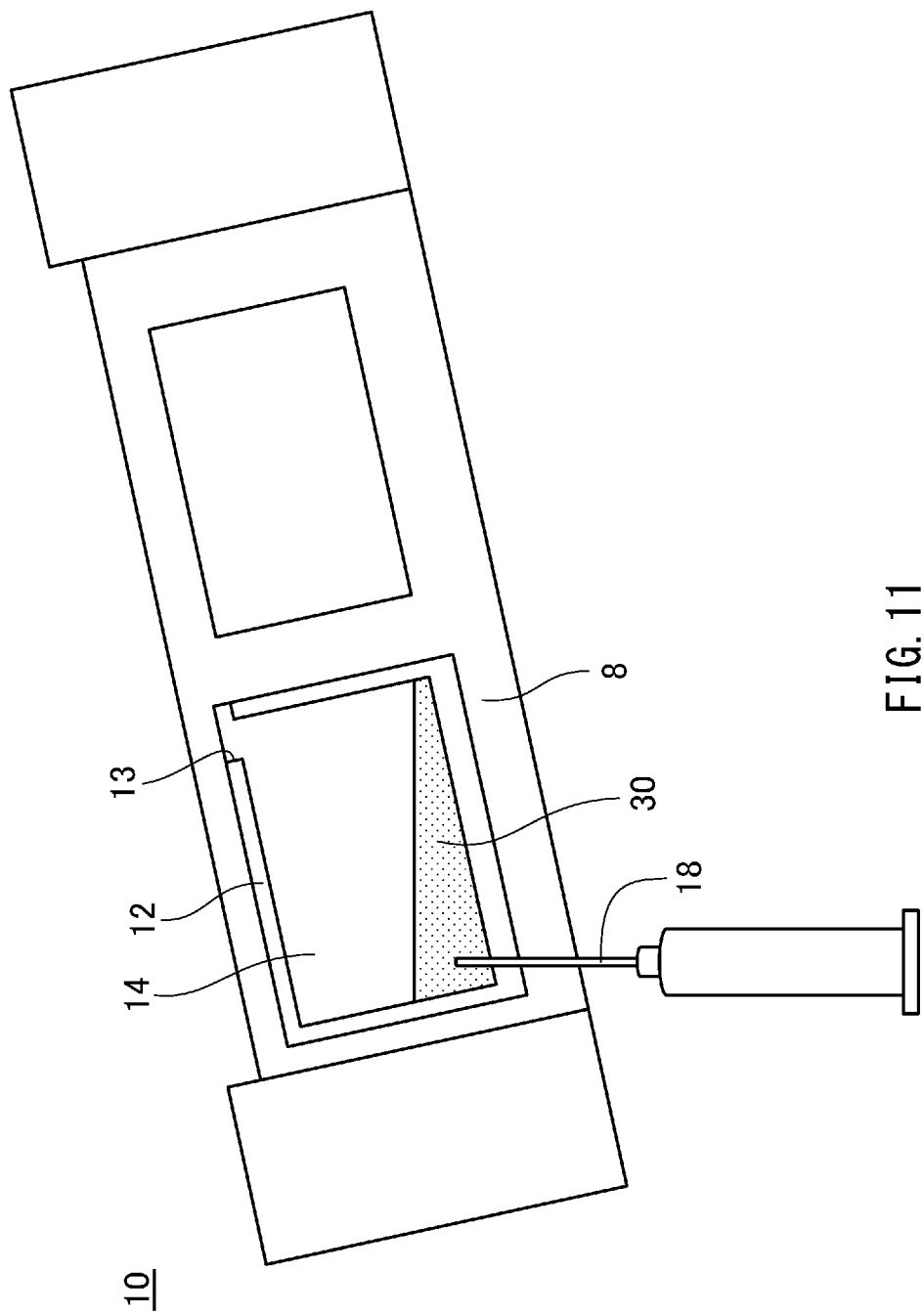
FIG. 11 is a side view illustrating a step of piercing a wall with a hollow needle to fill the resin filling space with a curable resin composition.

Although the embodiment described above injects the photocurable resin composition 30 by inserting the injection nozzle 17 through the opening 13, in the method for manufacturing the optical device according to the present technology, as shown in FIG. 11, the elastic wall 12 may be pierced with the hollow needle 18, and the photocurable resin composition 30 may be injected into the resin filling space 14 through the hollow needle 18. The hollow needle 18 has a pointed tip like an injection needle to pierce the wall 12, and the photocurable resin composition 30 is injected from the tip part inserted into the resin filling space 14. Since the wall 12 has elasticity and adhesiveness, it is closely contact with the hollow needle 18, so that the photocurable resin composition 30 does not leak out from the hole pierced by the hollow needle 18. Further, as the photocurable resin composition 30 is injected, the air in the resin filling space 14 is exhausted from the opening 13.

Thus, the opening diameter of the opening 13 can be limited to the minimum diameter necessary for exhaust, and the leakage of the photocurable resin composition 30 from the opening 13 can be suppressed. Further, the photocurable resin composition 30 may be injected in a state in which the tip of the hollow needle 18 is dipped in the photocurable resin composition 30 already injected in the resin filling space 14, so that the photocurable resin composition 30 can be injected at a high speed while preventing the mixing of air.

Although the position pierced by the hollow needle 18 may be any position in the wall 12, the position is preferably lower position of the resin filling space 14 on the side opposite to the opening 13 as shown in FIG. 11 in order to inject the photocurable resin composition 30 in a state where the tip of the hollow needle 18 is dipped in the photocurable resin composition 30 already injected in the resin filling space 14.

The wall 12 is preferably formed so that the portion pierced by the hollow needle 18 is relatively thicker than other portions. Thus, leakage of the photocurable resin composition 30 from the hole pierced by the hollow needle 18 can be prevented further effectively.

Modification 4

Further, in the method for manufacturing the optical device according to the present technology, the filling step of filling the resin filling space 14 with the photocurable resin composition 30 and the curing step of curing the photocurable resin composition 30 filling the resin filling space 14 may be performed in parallel. That is, while the resin filling space 14 is filled with the photocurable resin composition 30, the photocurable resin composition 30 filling the resin filling space 14 may be irradiated with curing light to sequentially proceed the curing reaction.

By sequentially curing the photocurable resin composition 30 before the entire resin filling space 14 is filled, the increase in the internal pressure due to the filling of the uncured photocurable resin composition 30 into the resin filling space 14 can be suppressed, the load applied on the transparent panel 4 and the optical member 2, which are becoming thinner, can be reduced, and the cured resin layer 3 can be formed to a uniform thickness.

Further, by carrying out the filling step and the curing step of the photocurable resin composition 30 in parallel, the manufacturing time can be reduced.

Modification 5

Moreover, according to the method for manufacturing the optical device according to the present technology, in the step of filling the resin filling space 14 with the photocurable resin composition 30, the air in the resin filling space 14 may be sucked through the opening 13 to reduce the pressure. Thus, the photocurable resin composition 30 filling the resin filling space 14 is prevented from being mixed with air, and the resin filling space 14 can be filled with the photocurable resin composition 30 at a high speed, thereby reducing the filling time.

Modification 6

Furthermore, in the method for manufacturing the optical device according to the present technology, two openings 13 may be provided as an injection hole for injecting the photocurable resin composition 30 and an exhaust hole for exhausting air in the resin filling space 14. The injection hole and the exhaust hole may be provided close to each other or may be provided apart from each other as long as both holes can be directed vertically upward at the filling step of the photocurable resin composition 30.

Modification 7

Figure 12:
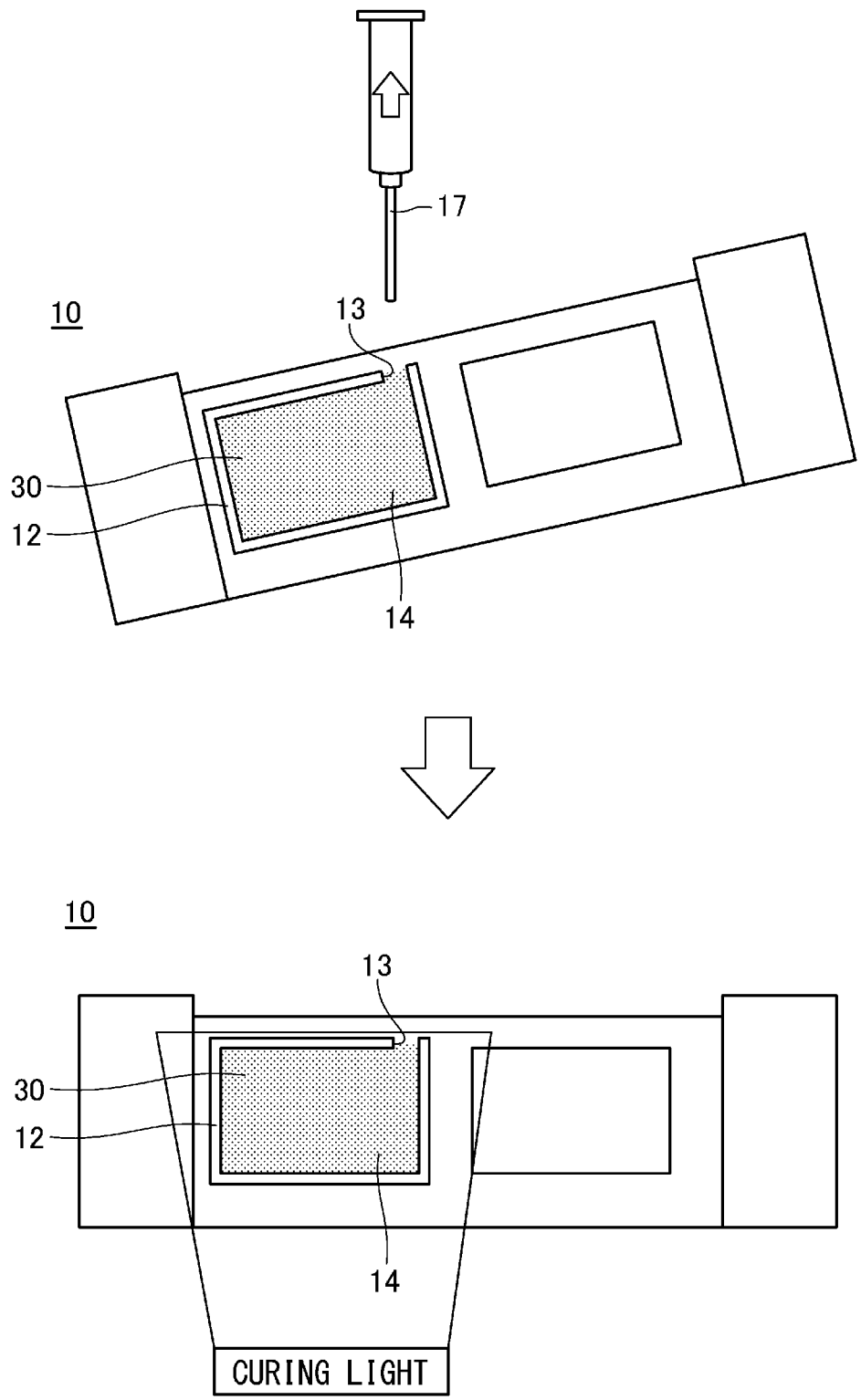
FIG. 12 is a side view illustrating a step of tilting the laminated body to fill the resin filling space with the curable resin composition and then returning it to a horizontal position for curing.

Furthermore, in the method for manufacturing an optical device according to the present technology, in a case that the laminated body 10 is tilted so that the opening 13 is positioned at the uppermost position to inject the photocurable resin composition 30 as shown in FIG. 7, the laminated body 10 may be returned to the horizontal position when the curing light is applied to the resin filling space 14 as shown in FIG. 12. Thus, the tilting of the laminated body 10 can prevent the unfilled portion of the photocurable resin composition 30 from being formed in the vicinity of the opening 13 of the resin filling space 14. Accordingly, the photocurable resin composition 30 is injected up to the opening 13 so that the cured light can be irradiated in a state in which the entire display area is filled with the photocurable resin composition 30.

Similarly, in the structure in which the projecting portion 13a is formed in the opening 13 as shown in FIG. 9, in a case that the laminated body 10 is tilted so that the opening 13 is positioned at the uppermost position to inject the photocurable resin composition 30, the laminated body 10 may be returned to the horizontal position when the curing light is applied to the resin filling space 14 as shown in FIG. 13.

EXAMPLES

Next, examples of forming a multi-panel optical device by using the present technology will be described. In the present example, one cover glass as the transparent panel 4 and two liquid crystal displays (LCD) as the optical member 2 are prepared, and the respective liquid crystal displays are bonded to the one cover glass via an ultraviolet-curable cured resin layer to form a multi-panel optical device. On the cover glass, black frame-shaped light shielding portions are formed at positions corresponding to the periphery of the display area of each LCD.

Next, the liquid crystal display is placed on the table of a dispenser applicator. Then, as the photocurable resin composition constituting the wall 12, an optical elastic resin (Product Name CA 201; manufactured by Dexerials Corporation) having a viscosity of 50,000 mPa*S was set in an injection nozzle (manufactured by Musashi Engineering).

Next, the optical elastic resin was applied to the display surface of the LCD under the conditions of a gap between the injection nozzle and the LCD of 0.9 mm, a dispensing pressure of 0.5 MPa, and an application speed of 30 mm/sec. In the present example, the optical elastic resin was applied in a substantially frame-like shape corresponding to the light shielding portion, and is applied at a position offset by 0.5 mm outside from the opening of the frame-shaped light shielding portion formed on the cover glass. A part of the frame shape is not applied with the optical elastic resin to define the opening.

Immediately after the application, the optical elastic resin was irradiated with ultraviolet light (4,000 mJ/cm$^2$) and cured. As a result, the wall having a height of about 0.7 mm and a width of about 2.0 mm was formed.

Then, the cover glass was fixed in the vertical direction by a fixing plate, the back surface of the LCD having the wall formed on the display surface side was fixed to another fixing plate, the cover glass and the LCD are aligned and bonded so as to have a gap of 0.5 mm, thereby forming a laminated body having a resin filling space. Further, the cover glass and the LCD were pressed to deform the wall by about 0.2 mm in height. As a result, the wall was deformed in accordance with the unevenness of the upper surface, brought into tight contact with the cover glass and the LCD, and protruded from the upper surface of the light shielding portion to the display region side by 1 mm.

Next, the injection nozzle was inserted from the opening to fill the resin filling space with the photocurable resin composition constituting the cured resin layer. As the photocurable resin composition, 18V028 having a viscosity of 20 mPa*S manufactured by Dexerials Corporation was used. As the injection nozzle #22 Musashi Engineering 70 cc syringe was used.

The filling step was carried out in a state in which the laminated body was stood up so that the surface direction was vertical and tilted so that the opening was positioned at the uppermost position. The filling step was completed when the photocurable resin composition was injected up to the opening.

Then, the laminated body was irradiated with a predetermined amount of ultraviolet light (2,000 mJ/cm$^2$) from the cover glass side to cure the photocurable resin composition. Further, the opening was irradiated with a predetermined amount of ultraviolet light (2,000 mJ/cm$^2$) to cure the photocurable resin composition filling the opening. As a result, an optical device in which the cover glass and the LCD are bonded together via a cured resin layer was obtained. Thereafter, the fixing member on the LCD side was released. The above-described steps were repeated to obtain a multi-panel optical device.

In the multi-panel optical device thus obtained, no leakage of the photocurable resin composition was observed, the bonding strength between the cover glass and the LCD was sufficient, and the curing of the wall on the upper surface of the light shielding portion was confirmed.

DESCRIPTION OF REFERENCE CHARACTERS 1 optical device, 1A single-plate optical device, 1B multi-plate optical device, 2 optical member, 3 cured resin layer, 4 transparent panel, 8 light shielding portion, 9 display portion, 10 laminated body, 12 wall, 13 opening, 14 resin filling space, 16 fixing plate, 17 injection nozzle, 18 hollow needle, 30 photocurable resin composition, 31 first cured resin composition

What is claimed is:

1. An optical device, comprising:
    an optical member;
    a transparent panel bonded to the optical member; and
    a cured resin layer interposed between the optical member and the transparent panel,
    wherein, on the transparent panel, a light shielding portion is formed in a region corresponding to a peripheral edge of a display region of the optical member,
    wherein, on a display region side of the light shielding portion, a wall defining a forming region for the cured resin layer is formed,
    wherein the cured resin layer and the wall have light transmitting properties, and
    wherein the wall portion is formed in a display portion of the optical member.

2. A method for manufacturing the optical device according to claim 1, comprising:
    a step of forming, on one of the optical member and the transparent panel, the wall surrounding a forming region for the cured resin layer and having at least one opening;
    a step of laminating the optical member and the transparent panel to form a laminated body in which a resin filling space surrounded by the wall is formed between the optical member and the transparent panel;
    a step of filling the resin filling space of the laminated body with a photocurable resin composition; and
    a step of curing the photocurable resin composition to form the cured resin layer,
    wherein the photocurable resin composition comprises:
    (a) an elastomer;
    (b) an acrylic monomer; and
    (c) a photopolymerization initiator.

3. The method for manufacturing an optical device according to claim 2, wherein the photocurable resin composition is injected into the resin filling space through a hollow needle pierced through the wall.

4. The method for manufacturing an optical device according to claim 3, wherein the wall is formed to have a relatively large thickness at a portion to be pierced by the hollow needle.

5. The method for manufacturing an optical device according to claim 2, wherein, in the step of filling the resin filling space with the photocurable resin composition, inside air of the resin filling space is sucked through the opening and inside pressure is reduced.

6. The method for manufacturing an optical device according to claim 2, wherein the step of filling the resin filling space with the photocurable resin composition and the step of curing the photocurable resin composition filling the resin filling space is conducted in parallel.

7. The method for manufacturing an optical device according to claim 2, wherein the opening is provided with two holes of an injection hole for injecting the photocurable resin composition and an exhaust hole for exhausting air in the resin filling space.

8. The method for manufacturing an optical device according to claim 2, wherein the photocurable resin composition is injected with the opening directing upward.

9. The method for manufacturing an optical device according to claim 2, wherein the laminated body is tilted so that the opening is positioned at the uppermost position to inject the photocurable resin composition.

10. The method for manufacturing an optical device according to claim 9, wherein the laminated body is returned to a horizontal position and then the photocurable resin composition is cured to form the cured resin layer.

11. The method for manufacturing an optical device according to claim 2,
wherein, on the transparent panel, a light shielding portion is formed in a region corresponding to the peripheral edge of a display region of the optical member, and
wherein the wall is provided on the display region side of the light shielding portion surrounding the display region of the optical member.

12. The method for manufacturing an optical device according to claim 11, wherein the wall is formed from the upper surface of the light shielding portion to the display region side.

13. The method for manufacturing an optical device according to claim 2, wherein the wall and the cured resin layer are made of the same photocurable resin composition.

14. The optical device according to claim 1, wherein the wall is formed from the upper surface of the light shielding portion to the display region side.

15. The optical device according to claim 1, wherein the wall portion has an opening provided therein and the opening is provided with a projecting portion extending outside a region where the cured resin layer is formed.

16. The optical device according to claim 1, wherein the wall and the cured resin layer are made of the same photocurable resin composition.

17. An optical device, comprising:
a plurality of optical members;
one transparent panel bonded to the plurality of optical members; and
a cured resin layer interposed between the plurality of optical members and the transparent panel,
wherein, on the transparent panel, a light shielding portion is formed in a region corresponding to a peripheral edge of a display region of the optical member,
wherein, on a display region side of the light shielding portion, a wall defining a filling region for the cured resin layer is formed,
wherein the cured resin layer and the wall have light transmitting properties, and
wherein the wall portion is formed in a display portion of the optical member.

18. A method for manufacturing the optical device according to claim 17, comprising:
a step of forming, on one of the optical member and the transparent panel, the wall surrounding a forming region for the cured resin layer and having at least one opening;
a step of laminating the optical member and the transparent panel to form a laminated body in which a resin filling space surrounded by the wall is formed between the optical member and the transparent panel;
a step of filling the resin filling space of the laminated body with a photocurable resin composition; and
a step of curing the photocurable resin composition to form the cured resin layer,
wherein the photocurable resin composition comprises:
(a) an elastomer;
(b) an acrylic monomer; and
(c) a photopolymerization initiator.

19. The method for manufacturing an optical device according to claim 18, wherein the photocurable resin composition is injected into the resin filling space through a hollow needle pierced through the wall.

20. The method for manufacturing an optical device according to claim 19, wherein the wall is formed to have a relatively large thickness at a portion to be pierced by the hollow needle.

21. The method for manufacturing an optical device according to claim 18, wherein, in the step of filling the resin filling space with the photocurable resin composition, inside air of the resin filling space is sucked through the opening and inside pressure is reduced.

22. The method for manufacturing an optical device according to claim 18, wherein the step of filling the resin filling space with the photocurable resin composition and the step of curing the photocurable resin composition filling the resin filling space is conducted in parallel.

23. The method for manufacturing an optical device according to claim 18, wherein the opening is provided with two holes of an injection hole for injecting the photocurable resin composition and an exhaust hole for exhausting air in the resin filling space.

24. The method for manufacturing an optical device according to claim 18, wherein the photocurable resin composition is injected with the opening directing upward.

25. The method for manufacturing an optical device according to claim 18, wherein the laminated body is tilted so that the opening is positioned at the uppermost position to inject the photocurable resin composition.

26. The method for manufacturing an optical device according to claim 25, wherein the laminated body is returned to a horizontal position and then the photocurable resin composition is cured to form the cured resin layer.

27. The method for manufacturing an optical device according to claim 18
wherein, on the transparent panel, a light shielding portion is formed in a region corresponding to the peripheral edge of a display region of the optical member, and
wherein the wall is provided on the display region side of the light shielding portion surrounding the display region of the optical member.

28. The method for manufacturing an optical device according to claim 27, wherein the wall is formed from the upper surface of the light shielding portion to the display region side.

29. The method for manufacturing an optical device according to claim 18, wherein the wall and the cured resin layer are made of the same photocurable resin composition.

30. The optical device according to claim 17, wherein the wall is formed from the upper surface of the light shielding portion to the display region side.

31. The optical device according to claim 17, wherein the wall portion has an opening provided therein and the opening is provided with a projecting portion extending outside a region where the cured resin layer is formed.

32. The optical device according to claim 17, wherein the wall and the cured resin layer are made of the same photocurable resin composition.

33. The optical device according to claim 17, wherein the light shielding portion formed in the region corresponding to the peripheral edge of the display region of the optical member is formed so as to share one side with a light shielding portion formed at a periphery of a display region of another optical member adjacent to the optical member.

* * * * *